Nov. 24, 1959 D. W. NORWOOD 2,913,955
DIRECT READING LIGHT METER AND LIGHT VALVE UNIT THEREFOR
Filed Jan. 28, 1957
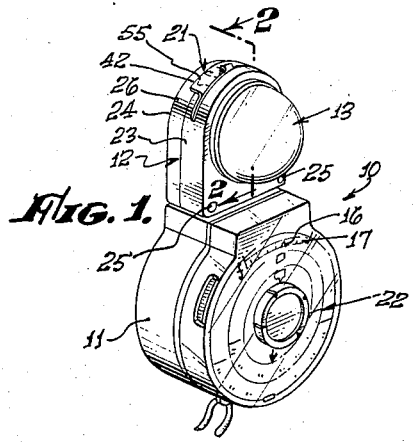
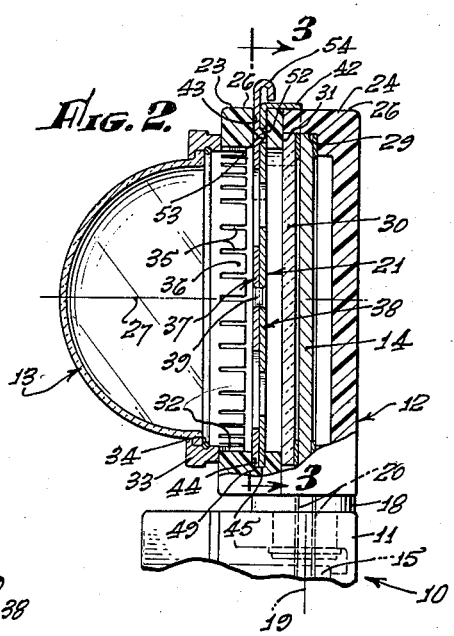
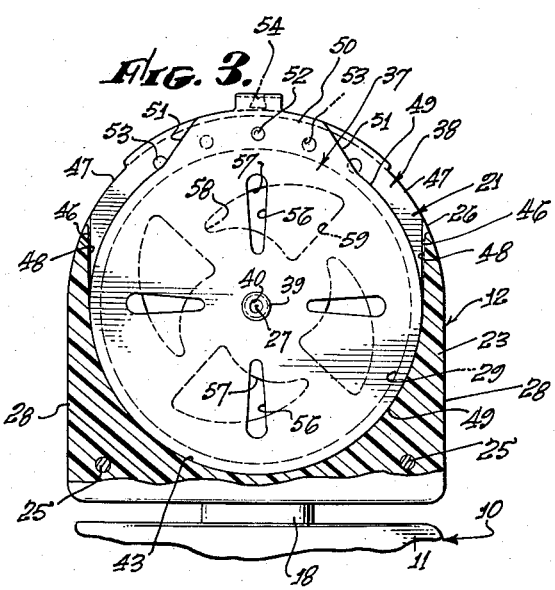
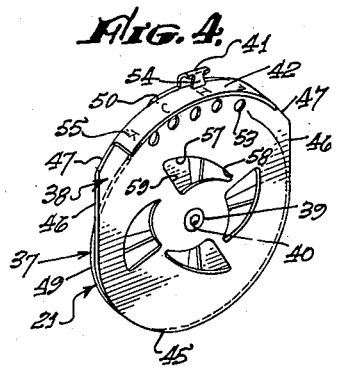
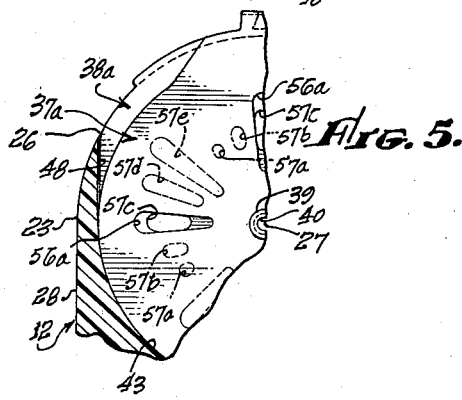
DONALD W. NORWOOD,
INVENTOR.
By William P. Green
ATTORNEY.

United States Patent Office 2,913,955
Patented Nov. 24, 1959

2,913,955

DIRECT READING LIGHT METER AND LIGHT VALVE UNIT THEREFOR

Donald W. Norwood, Pasadena, Calif., assignor to Donald H. Norwood, Pasadena, Calif., trustee Application January 28, 1957, Serial No. 636,541

11 Claims. (Cl. 88—23)

This invention relates to improved photographic light meters, for determining the proper setting of a camera under prevailing light conditions.

The meters embodying the invention are of the type referred to as direct reading meters, that is, meters in which the reading indicated by the movable pointer of the device is given in terms of a directly usable camera setting, usually a lens aperture setting, instead of reading in foot-candles or some other factor which must be converted to lens aperture before it can actually be applied to the camera. In order to enable the device to give such a direct reading, it is necessary that the meter be designed to assume predetermined values for one or more of the variables which are normally encountered in picture taking. More specifically, the device may be designed to assume that a particular type of film and a particular shutter time is to be used, so that the light actuated pointer may then be calibrated to give directly a proper lens aperture setting for use in conjunction with those assumed film sensitivity and shutter speed values.

In order to render a direct reading meter of this type as versatile as possible, it is desirable to so design the meter that it can be preset to assume more than one set of built-in valves, to thereby allow the meter to be direct reading under several different sets of conditions. The general object of the present invention is to provide improved means for thus presetting a meter to any of various different assumed conditions, and in a manner such that a relatively few settings will take care of most of the picture taking conditions which are normally encountered by a photographer. This conversion of the device between its different conditions is effected by a light valve arrangement which variably and controllably blocks off a portion of the light passing to the light sensitive cell of the meter.

The problems encountered in designing a suitable light valve for this purpose are quite severe. In the first place there are very exacting space limitations to which the overall size of the light valve must conform. The valve must not extend out laterally to any great extent or it may interfere with the light acceptance angle required by the meter, particularly where the meter uses a hemisphere type of light collector such as that shown in my Patent No. 2,214,284, issued September 10, 1940. Also, the valve must not have excessive thickness in the direction of light travel or it will interfere with the proper internal distance relationship between the light collector and the photovoltaic cell.

In the second place, the valve must provide for a great range of different light transmission values, from a condition in which as little as about 2.5% of the available light is passed to the photovoltaic cell, to a condition in which virtually 100% of the light, or as high a percentage as possible, passes to the cell. Such a 100% condition is desirable for passing a maximum amount of the available light to the cell under very poor lighting conditions. In this setting, the meter may or may not be direct reading. In all settings of the device, the transmission values provided for must be exact and reproducible each time the valve is set by the operator.

Previous attempts to make light valves for this purpose have not resulted in practical devices. Frequently the difficulty lay in the large number of steps required in a scale which would extend uniformly from 2.5% transmission to 100% transmission. Also the 100% transmission effect was difficult to achieve due to interference from internal elements of the light valve.

A careful analysis of the photographic requirements for such a light valve revealed some significant facts. It developed that, though a 100% or at least a very high light transmission condition is virtually essential, there is a rather wide range beneath 100% for which there is no necessity to set the device. In most cases, it is desirable to be able to set the device for light transmission values between about 2.5% and 16%, but beyond that upper limit there is no necessity for an adjustment short of the maximum setting.

With this background information in mind, I have designed the present device to have what might be called a two stage type of action, according to which the device is adjustable to any of several different light passing conditions within a first useful range (say 2.5% to 16% transmission) and is also convertible to a predetermined maximum light transmission condition, or second stage, but is not convertible to any of the various possible conditions between these two stages. This arrangement satisfies virtually all of the commonly encountered photographic conditions, and yet does not limit the accuracy of the settings by attempting to cover other light transmission conditions within the non-useful range.

To attain the above discussed results I employ a unique light valve unit which can be positioned in the path of light to the light sensitive cell, and which is adjustable to any of various settings within the discussed relatively low transmission range. In order to attain the maximum light transmission condition, this entire adjustable valve structure is mounted for movement as a unit out of the light path.

To allow the device to meet the exacting space requirements which are encountered, the valve unit is preferably formed as a slide structure, which is completely detachable from the body of the meter in the maximum transmission condition. The valve unit may include two relatively rotatably adjustable apertured plates, having detent means for holding them in different relative settings, and having indicator means for indicating those settings. Preferably, the detent means allow resetting of the valve unit only when it has been at least partially withdrawn from its active position to thus prevent accidental changing of the setting.

The above and other features of the present invention will be better understood from the following detailed description of the typical embodiment illustrated in the accompanying drawing in which:

Fig. 1 is a perspective view of a photographic light meter embodying the invention;

Fig. 2 is an enlarged fragmentary section taken on line 2—2 of Fig. 1;

Fig. 3 is a transverse section taken on line 3—3 of Fig. 2;

Fig. 4 is a perspective view of the light valve unit as it appears when removed from the body of the meter, and Fig. 5 is a fragmentary view corresponding to Fig. 3, but showing a slightly variational form of the invention.

Referring first to Figs. 1 through 4, the meter 10 shown in those figures includes a main body 11 and an upper smaller body portion 12 carrying a light collector element 13. The upper body portion 12 contains a conventional light sensitive photovoltaic cell 14, which acts to develop a light induced voltage varying in accordance with the amount of light falling on cell 14 from collector 13. The voltage developed by cell 14 is fed through suitable conductors to a conventional electrically actuated meter or indicator unit which is contained within the main body 11 of the device, and is typically represented at 15 in Fig. 2. This meter unit 15 includes a movable pointer 16 which is electrically actuated to positions indicating different lens aperture settings on an associated scale 17 which is visible from the front of body 11. The upper body section 12 may be mounted to lower body section 11 by a swivel connection 18, constructed to allow rotary adjusting movement of section 12 relative to main body 11 about axis 19. This swivel connection 18 is preferably hollow, to pass therethrough the electric leads 20 extending from element 14 to the meter or indicator unit 15.

The upper body section 12 is adapted to removably receive the light valve unit 21, which is positioned along the path of light between collector 13 and photovoltaic cell 14, to controllably vary the amount of light which is transmitted to cell 14. The valve unit 21 is adjustable to several different settings, and in each of those settings functions to preset the overall meter device for a particular film sensitivity and shutter time associated with that setting. In each of these settings, the pointer 16 then indicates directly on scale 17 the correct F-stop setting to be used under existing light conditions if the specified film sensitivity and shutter time are also used. If, under unusual conditions, it is desired to use a film sensitivity-shutter time combination for which the valve unit 21 can not be set, then the reading of pointer 16 can be converted to a proper value for any desired film sensitivity and shutter time conditions, by means of a special factor converter or calculator device 22 which may be mounted on the front of main body 11 of the meter. This calculator 22 may be of the type more specifically described and claimed in my co-pending application Serial No. 608,889, filed September 10, 1956, for "Direct Reading Photographic Exposure Meters and Calculator Devices Therefor," now U.S. Patent No. 2,824,696.

The upper body section 12 of the device shown in Figs. 1–4 may be formed of two rigid parts 23 and 24, typically formed of a suitably rigid opaque resinous plastic material, and suitably secured together, as by screws 25. The upper surfaces 26 of these two parts 23 and 24 may be curved cylindrically about the main axis 27 defining the center of the light path from collector 13 to cell 14. As the cylindrical surfaces 26 curve downwardly, they merge with and form continuations of a pair of parallel opposite side surfaces 28 of sections 23 and 24.

The light sensitive photovoltaic cell 14 may take the form of a circular disc, which is mounted within a correspondingly shaped recess 29 formed in part 24 of upper body portion 12. A transparent glass disc 30 is preferably disposed across the forward face of element 14, and is held in position by abutment against an annular shoulder 31 formed by body part 23. Light passes to cell 14 from collector dome 13 through a cylindrical passage 32 formed in part 23, which passage is centered about the previously mentioned axis 27. Into the forward side of bore 32, there is removably connected a ring 33 which carries the translucent hemispherical light collector dome 13, the dome being typically retained within ring 33 by a suitable resilient locking ring 34. The axially inner portion of ring 33 may contain a series of circularly spaced slits 35, to form between those slits a series of resilient spring fingers 36 which act to frictionally grip the wall of passage 32 to releasably hold the light collector unit in its illustrated Fig. 2 position of attachment to part 23.

Fig. 4 shows the appearance of light valve unit 21, as it appears when removed from its active position within upper body section 12. This valve unit is formed of two thin plates 37 and 38, which are preferably formed of thin resilient sheet metal (typically sheet steel). These two plates are held in direct axially abutting interengagement by means of a center rivet 39, which mounts forward plate 37 for rotary adjusting movement relative to rear plate 38. When the valve unit 21 is in its Fig. 2 active position within the body of the meter, the axis about which forward plate 37 is thus rotatively adjustable coincides with the main light axis 27 of the device. The rivet 39 is annular and is centered about axis 27 in the Fig. 2 position, and contains a central aperture 40 through which some light may pass to the center of cell 14 in all of the various adjusted conditions of valve unit 21. The use of such a light passing rivet 39 at the center of the valve structure assists in assuring sufficiently uniform distribution of light across the face of element 14.

Except at their upper turned portions 41 and 42 (later to be discussed), the two plates 37 and 38 are planar, and when located in their active Fig. 2 positions, these plates extend directly transversely of the axis 27. The two plates 37 and 38 and rivet 39 are insertible downwardly into the upper body portion 12 by reception within a planar slit or recess 43 formed in the upper portion of part 23, which recess may be considered as having a lower continuation forming a groove 44 which extends radially outwardly into part 23 about the periphery of bore 32, and is of an axial thickness just sufficient to exactly receive and effectively confine the edges of plates 37 and 38 when in the Fig. 3 active position. As will be apparent, the recess 43 and groove 44 lie in a plane which extends transversely of axis 27, to mount valve unit 21 in a correspondingly transverse plane.

The rear plate 38 has a lower semi-circular peripheral edge 45 of a diameter to fit into annular groove 44. At the opposite sides of this rear plate 38, the circular edge 45 merges with a pair of parallel vertically extending straight side edges 46, which extend upwardly to merge with a pair of arcuate edges 47 lying essentially in the cylindrical plane of upper surfaces 26 of the meter body. The engagement of side edges 46 with a pair of parallel shoulders 48 defining the sides of slit 43 serves to effectively hold plate 38 against rotary movement when it is received within body section 12. At its upper edge, plate 38 carries the previously mentioned portion 42, which is turned or bent to extend cylindrically about axis 27, and to engage cylindrical surface 26 of the body in the active position about unit 21. This engagement of the two similarly shaped cylindrical surfaces 42 and 26 coacts with the engagement of shoulders 46 and 48 in assuring retention of plate 38 in proper position within the body of the device.

The forward plate 37 of valve unit 21 is defined peripherally by a circularly extending edge 49, except at the location of an upwardly projecting portion 50 which extends beyond the diameter of the circular edge 49 and the corresponding circular edge 45 of plate 38. Plate 37 is rotatively adjustable about axis 27 relative to plate 38, with this adjusting movement being limited by engagement of a pair of shoulders or side edges 51 on portion 50 of plate 37 with the previously mentioned shoulders 48 of body part 23. Plate 37 is adapted to be releasably held in any of several (typically 5) different positions relative to plate 38, this holding action being effected by a small detent lug or projection 52 which is formed on the rear side of plate 37 by locally deforming that plate. This lug 52 is selectively receivable within any of five different uniformly spaced apertures 53 formed in plate 38, to thus hold the plates in the desired different positions. Plates 37 and 38 are preferably formed of resiliently deformable material, which normally urges lug 52 into whichever of the apertures 53 is at a particular time located opposite the lug, to thus assure the desired detenting action. The upper turned portion 41 of plate 37 forms a pointer tab 54, which is received opposite five different markings 55 respectively on portion 42 of plate 38 in the five different settings of plate 37, to thus indicate to a user the setting of valve unit 21. These five markings 55 are preferably five different letters, such as the letters C, F, H, J, and K, each referring to a particular film sensitivity and shutter time combination for which the device is preset when the valve unit is set to the letter in question. For example, the setting designated by the letter F, may be appropriate for a camera shutter time of $\frac{1}{60}$ second used in combination with a film having a sensitivity of ASA 32. The setting designated by the letter H may be appropriate for a camera shutter time of $\frac{1}{32}$ second used in combination with a film sensitivity of ASA 32, etc.

The detent structure 52—53 is desirably so designed as to positively lock plate 37 against adjustment relative to plate 38 as long as these two plates are in their Fig. 2 active position within the meter device. In order to attain this result, slit 43 formed in the upper portion of body 23 may be formed of a width corresponding substantially to the combined thickness of the two plates 37 and 38, with the slit 43 therefore being too narrow to allow relative separation of plates 37 and 38 far enough to permit detent lug 52 to move out of one of the apertures 53 as long as the lug and aperture are received within the body slit 43. Thus, the valve unit 21 must be withdrawn upwardly sufficiently far to move lug 52 out of the body before plate 37 can be adjusted to a new position. This very effectively prevents accidental changing of the setting of valve unit 21 while it is fully inserted into the body.

In order to effect the desired change in light transmission characteristics of valve unit 21 in response to rotation of plate 37 relative to plate 38, the plate 37 has four evenly circularly spaced light passing apertures 56, and the rear plate 38 has four evenly circularly spaced apertures 57 coacting with apertures 56. Except at the locations of these apertures 56 and 57, and at the center of rivet 39, these plates 37 and 38 are of course opaque. The four apertures 56 in plate 37 may be relatively narrow, and be elongated in directions extending radially outwardly from axis 27. The coacting apertures 57 in plate 38 may have the wedge shaped configuration illustrated in Figs. 3 and 4, to progressively increase in radial dimension from their small ends 58 to their larger ends 59. At these larger ends, the radial extent of apertures 57 corresponds substantially to the radial extent of apertures 56, whereas at the smaller ends 58, the radial extent of apertures 57 constitutes only a very small part of the radial extent of apertures 56. In the center position of plate 37, that is, the position represented in Fig. 3, apertures 56 are positioned opposite circularly central portions of the apertures 57, so that light may pass through only a portion of each of the apertures 56 to cell 14. When plate 37 is adjusted from that position in a clockwise direction as seen in Fig. 3, the plate 38 blocks off smaller portions of the apertures 56, and in the furthest position to which element 37 will turn in that clockwise direction, light can pass through the entire area of each of the apertures 56. Thus, the relative adjustment of plate 37 relative to plate 38 gives the desired plurality of different very accurately predeterminable light transmission settings, in the five different detented positions.

To now describe the use of the device shown in Figs. 1–4, assume first that it is desired to utilize the meter in taking pictures with an ASA 32 film at $\frac{1}{32}$ of a second shutter time. The first step then is to set valve 37 to a proper position relative to plate 38, as to the "H" position of Figs. 3 and 4. The valve unit is then inserted into the body to the Figs. 2 and 3 position, and the light collector 13 is then pointed in a proper direction for taking an incident light reading. The light from collector 13 passes through the registering portions of apertures 56 and 57, and through the passage in rivet 39, to fall on light sensitive cell 14, and cause it to develop an energizing voltage which is then fed to the electrically actuated meter unit 15. This voltage causes pointer 16 to move to a position opposite scale 17, such that the reading on the scale directly indicates the proper F-stop setting for the camera under the assumed conditions. Most photographers will then continue to take the bulk of their pictures at this single setting of the valve unit. If, however, a different shutter time and film sensitivity combination is desired, then the valve unit 21 may be partially withdrawn from the meter body, and then set to a desired new position designated by the positioning of pointer 54 relative to markings 55, so that the pointer 16 will then be direct reading for the new set of assumed conditions. When the very unusual circumstances arise in which a combination of shutter time and film sensitivity is desired which is not covered by the five settings of valve unit 21, then the factor converter 22 may be utilized for converting the reading of pointer 16 to satisfy an infinite number of different picture taking conditions. When the lighting conditions are extremely poor, it is desirable to admit a maximum amount of light to cell 14, in order that a usable reading can be obtained. In this circumstance, the entire valve unit at 21 is bodily slid upwardly and out of its position within body portion 12, so that the entire light path between collector and cell 14 is completely unobstructed by the valve unit. Thus, a 100% light transmission condition is attained in this way.

Fig. 5 is a view corresponding to Fig. 3, but showing a slightly variational form of the invention. In this Fig. 5 arrangement, all of the various parts are the same as in the previous form of the invention, except as to the manner of formation of the apertures in plate 38a (corresponding to plate 38 of Figs. 1 to 4). In Fig. 5 there is substituted for each of the apertures 57 of Figs. 1–4 a series of circularly spaced apertures 57a, 57b, 57c, 57d, and 57e. Each of these apertures 57a, 57b, etc. registers with the corresponding aperture 56a of plate 37a in one of the five settings of plate 37a. These various apertures 57a, 57b, etc. are of progressively decreasing radial dimension, so that they allow light to pass through different amounts of the total radial extent of apertures 56a, in much the same manner in which apertures 57 coacted with apertures 56 in Figs. 1–4. The operation of the Fig. 5 device is of course identical with that of Figs. 1–4.

I claim:

1. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, said plates of said valve assembly forming together a slide structure, means on said body mounting said valve assembly for bodily sliding movement essentially transversely of said axis and of said light path and from said active position in the light path to a position completely out of said light path, said plates having respective registering positions visible to the user when said assembly is in said active position, and registering indicia on said plate portions for indicating the relative position of said plates.

2. A photographic light meter comprising a meter body adapted to be carried in the hands of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, said plates of said valve assembly forming together a slide structure, and means on said body mounting said valve assembly for bodily sliding movement essentially transversely of said axis and of said light path and from said active position in the light path to a position completely out of said light path, one of said plates having a scale disposed outside said body when said assembly is in said active position, the other of said plates having a manually movable tab registering with said scale to indicate relative positions between said plates and for adjusting said relative positions.

3. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, said plates of said valve assembly forming together a slide structure, means on said body mounting said valve assembly for bodily sliding movement substantially transversely of said axis and of said light path and from said active position in the light path to a position completely out of said light path, and holding means operable to positively lock said valve plates in any pre-selected one of said relative positions when said valve assembly is in its active position in the light path and releasable to permit adjusting movement of the parts when said assembly has been slid from active position.

4. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, said plates of said valve assembly forming together a slide structure, means on said body mounting said valve assembly for bodily sliding movement substantially transversely of said axis and of said light path and from said active position in the light path to a position completely out of said light path, and detent shoulders on said plates interengageable to releasably hold said plates in any one of a plurality of different relative positions, said plates being constructed to resiliently urge said detent shoulders into holding interengagement, said means on said body slideably mounting said valve assembly including means forming a slot within which the valve assembly is slideably received, said slot being narrow enough to hold said two plates in positions such that said detent shoulders cannot pass one another to permit adjustment of said plates until said assembly is slid out of said active position.

5. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected by a fastener at substantially the center of said plates for relative rotary adjusting movement about a predetermined axis, said fastener having an opening extending therethrough which light may pass to said light-sensitive element, said plates having apertures adapted to register differently in different relative positions of the plates and to thereby vary the effective light passing area of the plates, said plates of said valve assembly forming together a slide structure, and means on said body mounting said valve assembly for bodily sliding movement substantially transversely of said axis and of said light path and from said active position in the light path to a position completely out of said light path.

6. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, one of said plates having light-passing apertures extending and elongated radially of said axis, the other plate having coacting apertures varying in radial dimension at different points about said axis to thereby vary the total light-passing area upon relative rotary movement of said plates, said plates of said valve assembly forming together a slide structure, and means on said body mounting said valve assembly for bodily sliding movement essentially transversely of said axis and of said light path and from said active position in the light path to a position completely out of said light path.

7. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, said plates of said valve assembly forming together a slide structure, said wall of said body having an outer substantially cylindrical curved surface and a first of said plates having a flanged portion at its periphery turned substantially axially and curved substantially arcuately about said axis and received adjacent said curved surface of said body in said active position of said valve assembly, and means on said body mounting said valve assembly for bodily sliding movement substantially transversely of said axis and of said light path and from said active position in the light path to a position completely out of said light path.

8. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, said plates of said valve assembly forming together a slide structure, said wall of said body having an outer substantially cylindrical curved surface and a first of said plates having a flanged portion at its periphery turned substantially axially and curved substantially arcuately about said axis and received adjacent said curved surface of said body in said active position of said valve assembly, the second of said plates having an indicator turned adjacent said curved flange of said first plate, and marks on said flange of said first plate coacting with said indicator portion of said second plate to indicate the different relative positions of said plates, and means on said body mounting said valve assembly for bodily sliding movement substantially transversely of said axis and of said light path and from said active position in the light path to a position completely out of said light path.

9. A photographic light meter comprising a meter body adapted to be carried in the hand of a user, a light sensitive element carried by said body, a hemispherical translucent light collector dome carried by said body opposite said light-sensitive element, indicator means carried by said body and actuable by said element to give an indication for use in setting a camera to meet prevailing light conditions, said body being constructed to pass light along a predetermined path from said dome to said element, a light valve assembly movable to an active position in said light path between said dome and said element, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, and means on said body mounting said valve assembly for bodily sliding movement substantially transversely of said axis and of said light path and from said active position in the light path to a position completely out of said light path.

10. A photographic light meter comprising a meter body adapted to be carried in the hand of the user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, said plates of said valve assembly forming together a slide structure, and means on said body mounting said valve assembly for bodily sliding movement substantially transversely of said axis and of said light path and from said active position in the light path to a position completely out of said light path, said valve assembly including detent means operable to releasably hold said valve plates in different relative positions.

11. A photographic light meter comprising a meter body adapted to be carried in the hand of a user, a light sensitive element carried by said body, indicator means carried by said body and actuable by said element to give an indication for use in setting a camera to meet prevailing light conditions, said body being constructed to pass light along a predetermined path, a light valve assembly movable to an active position in said light path, said valve assembly including two thin parallel closely adjacent plates interconnected for relative rotary adjusting movement about a predetermined axis, said plates having apertures adapted to register differently in different relative positions of the plates and to thereby vary the effective light passing area of the plates, indicator means on said assembly indicating different relative positions of said plates, said plates of said valve assembly forming together a slide structure, and means on said body mounting said valve assembly for bodily sliding movement essentially transversely of said axis and of said light path and from said active position in the light path to a position completely out of said light path.

References Cited in the file of this patent

UNITED STATES PATENTS

| | | |
|---|---|---|
| 842,314 | Heeley | Jan. 29, 1907 |
| 1,800,044 | Baird | Apr. 7, 1931 |
| 1,863,363 | Zworykin | June 14, 1932 |
| 2,145,427 | Morris | Jan. 31, 1939 |
| 2,150,047 | Bernhard et al. | Mar. 7, 1939 |
| 2,156,734 | McCune | May 2, 1939 |
| 2,186,203 | Centeno | Jan. 9, 1940 |
| 2,247,763 | Meyers | July 1, 1941 |
| 2,247,805 | Faus | July 1, 1941 |
| 2,389,617 | Freund | Nov. 27, 1945 |
| 2,439,330 | Zander | Apr. 6, 1948 |
| 2,579,661 | Freund | Dec. 25, 1951 |
| 2,700,916 | Muirhead | Feb. 1, 1955 |
| 2,744,200 | Taylor | May 1, 1956 |

FOREIGN PATENTS

| | | |
|---|---|---|
| 453,845 | Great Britain | Sept. 18, 1936 |
| 570,429 | Great Britain | July 6, 1945 |
| 968,759 | France | May 3, 1950 |